(12) United States Patent
Yang et al.

(10) Patent No.: US 12,574,957 B2
(45) Date of Patent: Mar. 10, 2026

(54) DISPLAY METHOD OF WIRELESS DEVICE FOR CONNECTION

(71) Applicant: Zhuhai Pantum Electronics Co., Ltd., Zhuhai (CN)

(72) Inventors: Zongxin Yang, Zhuhai (CN); Jibing Peng, Zhuhai (CN); Xiang Chen, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 445 days.

(21) Appl. No.: 18/181,829

(22) Filed: Mar. 10, 2023

(65) Prior Publication Data

US 2023/0292358 A1      Sep. 14, 2023

(30) Foreign Application Priority Data

Mar. 11, 2022     (CN) .......................... 202210237598.0
Dec. 5, 2022     (CN) .......................... 202211550364.8

(51) Int. Cl.
*H04W 72/56*          (2023.01)
*H04W 72/30*          (2023.01)
*H04W 76/10*          (2018.01)

(52) U.S. Cl.
CPC ........... *H04W 72/56* (2023.01); *H04W 72/30* (2023.01); *H04W 76/10* (2018.02)

(58) Field of Classification Search
None
See application file for complete search history.

(56) References Cited

U.S. PATENT DOCUMENTS

| | | | |
|---|---|---|---|
| 2010/0080174 A1* | 4/2010 | Zhu ...................... | H04W 48/18 |
| | | | 370/328 |
| 2012/0177020 A1* | 7/2012 | Chou .................... | H04W 76/20 |
| | | | 370/328 |
| 2013/0170482 A1 | 7/2013 | Jung | |
| 2017/0280492 A1 | 9/2017 | Kurihara | |
| 2018/0035365 A1* | 2/2018 | Koratekere Honnappa | ................ |
| | | | H04W 48/16 |
| 2022/0394794 A1* | 12/2022 | Zhang .............. | H04W 28/0215 |

FOREIGN PATENT DOCUMENTS

| | | |
|---|---|---|
| EP | 2891973 B1 | 7/2015 |
| EP | 3825832 A1 | 5/2021 |

* cited by examiner

*Primary Examiner* — Tuan S Nguyen

(74) *Attorney, Agent, or Firm* — Anova Law Group, PLLC

(57) ABSTRACT

A display method of a wireless device for connection includes, during a wireless device search, in response to a same wireless device being found through different communication methods, only displaying a first interaction component for the wireless device. The first interaction component is marked with device information of the wireless device. The first interaction component is configured, in response to a first interaction signal, to connect with the wireless device in a connection mode with a highest priority.

16 Claims, 7 Drawing Sheets

Request the characteristic information from the wireless device that is found — S221

Whether the same device has been found through different search methods — S222

Yes

Only display the first interaction component corresponding to the connection mode with the highest priority for the same wireless device that is found — S223

DISPLAY METHOD OF WIRELESS DEVICE FOR CONNECTION

CROSS-REFERENCE TO RELATED APPLICATION

This application claims the priority of Chinese Patent Application No. CN202210237598.0, filed Mar. 11, 2022, and No. CN202211550364.8, filed Dec. 5, 2022, the contents of all of which are incorporated herein by reference in their entirety.

TECHNICAL FIELD

The present disclosure relates to the technical field of wireless device interaction processing and, more particularly, to a display method of a wireless device for connection.

BACKGROUND

With development of wireless communication technology, multiple connection modes, such as local area network, Bluetooth, access point (AP), etc., may be used for connecting a wireless device. In existing technologies, in order to simplify operation process for a user, the user is not required to manually enter a connection-mode-selection interface. Instead, all connectable devices may be displayed. Although it is more convenient, a same device in different connection modes may be duplicately displayed, e.g., double or triple displayed by identical icons, on a same interaction interface, which easily causes the user to misjudge status of nearby connectable devices, thereby reducing user experience.

SUMMARY

In accordance with the disclosure, there is provided a display method of a wireless device for connection. The method includes, during a wireless device search, in response to a same wireless device being found through different communication methods, only displaying a first interaction component for the wireless device. The first interaction component is marked with device information of the wireless device. The first interaction component is configured, in response to a first interaction signal, to connect with the wireless device in a connection mode with a highest priority.

Also in accordance with the disclosure, there is provided a display method of a wireless device for connection. The method includes, when a wireless device is found connectable by search, and in response to the wireless device being connectable via a local area network, displaying the wireless device on a local-area-network-interaction interface in a form of a local-area-network-interaction component. The local-area-network-interaction component is configured, when being triggered, to establish a local-area-network connection with the wireless device. The local-area-network-interaction interface is only configured to display the local-area-network-interaction component corresponding to the wireless device that is connectable via the local area network.

BRIEF DESCRIPTION OF THE DRAWINGS

The accompanying drawings, which are incorporated in and constitute a part of this specification, illustrate the embodiments of the present disclosure and together with the description serve to explain the principles of the present disclosure.

DETAILED DESCRIPTION OF THE EMBODIMENTS

Various exemplary embodiments of the present disclosure will be described in detail with reference to the accompanying drawings. It should be noted that relative arrangements of components and processes, numerical expressions, and numerical values set forth in the embodiments do not limit the scope of the present disclosure unless specifically stated otherwise.

The following description of at least one exemplary embodiment is only illustrative in nature and in no way taken as any limitation of the present disclosure, and application or use thereof.

Techniques, methods, and devices known to those of ordinary skill in the art may not be discussed in detail, but where appropriate, such techniques, methods, and devices should be considered a part of this specification.

In all examples shown and discussed herein, any specific values should be construed as exemplary only, and not as limitations. Therefore, other instances of the exemplary embodiments may have different values.

It should be noted that similar numbers and letters refer to similar items in the following figures. Therefore, once an item is defined in one figure, it does not require further discussion in subsequent figures.

The present disclosure involves a display method of a wireless device for connection, which belongs to the field of wireless device interaction processing. The method is used to solve a disadvantage in existing technologies that a same device in different connection modes are duplicately displayed on an interaction interface, which easily causes a user to misjudge. The method includes, during a wireless device search, in response to a same wireless device being found through different communication methods, only displaying a first interaction component for the wireless device. The first interaction component is marked with device information of the wireless device. The first interaction component is configured, in response to a first interaction signal, to connect with the wireless device in a connection mode with a highest priority. An application of the present disclosure is a display strategy of the wireless device on the interaction interface.

Wireless devices mentioned in the following embodiments of the present disclosure may be devices with wireless connection functions, such as office devices and household devices with wireless communication functions. Wireless connections may be wireless local area network (WLAN), Bluetooth, Access Point (AP), etc.

Figure 1:
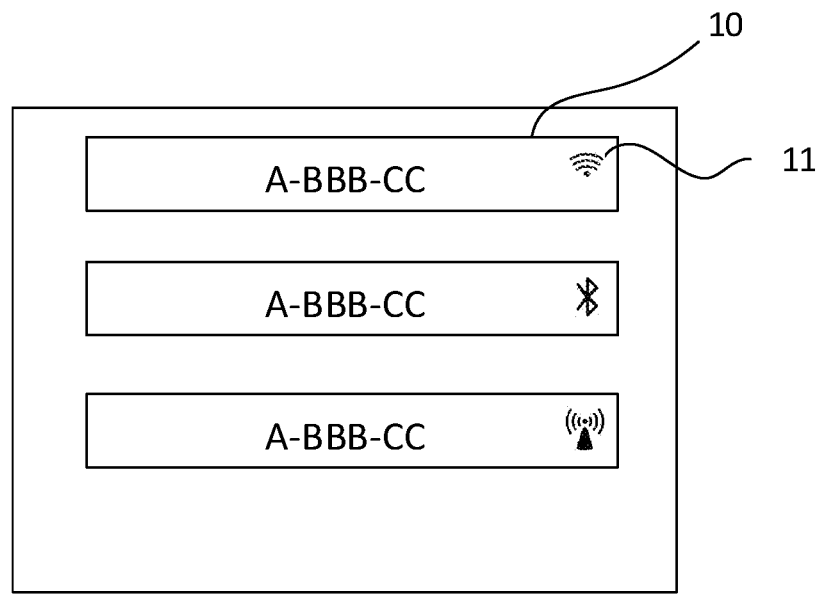
FIG. 1 illustrates a schematic diagram of repeated display for a same device in existing technologies.

The present disclosure relates to strategies of how to display wireless devices that are found on an interface. In some embodiments, the present disclosure may be based on the following scenario. A user intends to establish a connection with a wireless device through a mobile phone application. Each wireless device can provide different types of connections, and for example, some devices only provide Bluetooth connections, while some other devices only provide local-area-network-connections. In order to ensure a comprehensive search, the mobile phone application will try to use multiple communication methods to search, and display results obtained by each search method to improve user experience. However, if there are devices that support multiple wireless connection modes within a communication distance, the mobile application may duplicately search for a same device through different communication methods for display. For example, in a situation shown in FIG. 1, there are three alternative click buttons 10 appear on the interface, which are all from a same device with model number A-BBB-CC but with different connection modes (indicated by markings 11). This undoubtedly causes user barriers and reduce the user experience.

Figure 2:
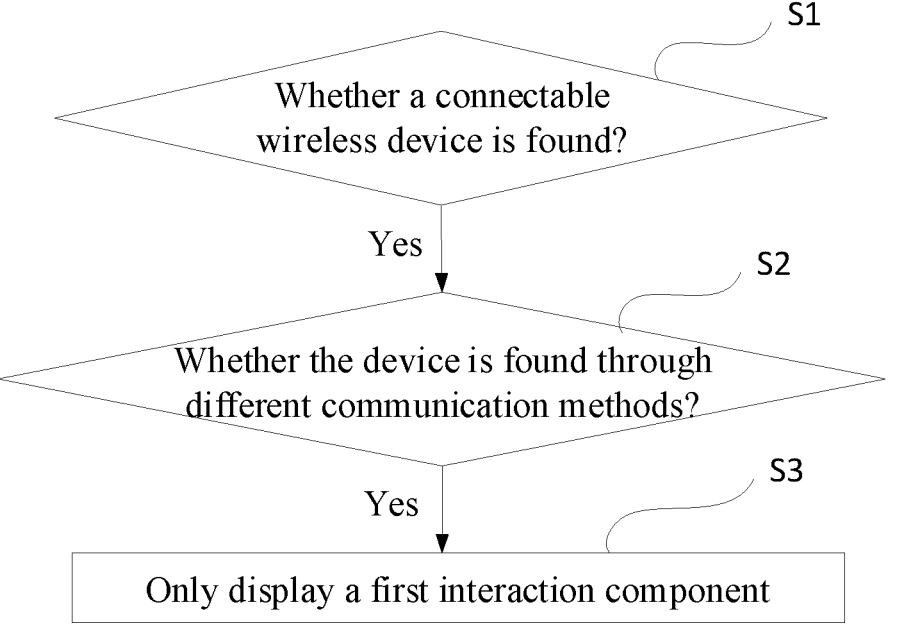
FIG. 2 illustrates a flow chart of an example embodiment of the present disclosure.

The present disclosure provides a display method of a wireless device for connection. The display method includes, during a wireless device search, in response to a same wireless device being found through different communication methods, only displaying a first interaction component for the wireless device. The first interaction component is marked with device information of the wireless device. The first interaction component is configured, in response to a first interaction signal, to connect with the wireless device in a connection mode with a highest priority. As for an implementation manner, reference may be made to FIG. 2. In operation S1, it is first determined whether a connectable wireless device is found, and if so, operation S2 is executed. In operation S2, it is determined whether the device is found through different communication methods, and if so, operation S3 is executed. In operation S3, only an interaction component corresponding to the connection mode with the highest priority is displayed. One interaction component can only correspond to one connection mode of one device.

The first interaction component may be an interaction area for providing user input. For example, in a touch screen mobile phone, the first interaction component may be an interaction button area provided by application software, and the user may trigger the first interaction signal by clicking on touch screen. If the wireless device receives the user input through a camera, the first interaction component may be a viewing frame. The first interaction signal is a signal triggered by the user, such as a combination of one or more of touch screen interaction, button interaction, infrared induction interaction, and somatosensory interaction. The device information can be marked on the first interaction component by graphics or texts. For example, in an embodiment shown in FIG. 3, model of the wireless device is marked on the first interaction component, which can facilitate the user to accurately select the device for connection. Only the first interaction component is displayed for the wireless device, which refers to that even if the same wireless device is found through multiple communication methods, only the interaction component corresponding to one connection mode (rather than multiple components) is displayed. The specific connection mode corresponding to the interaction component can be determined according to a preset priority order. For example, it is preset that local-area-network-connection>Bluetooth connection>AP connection. When the same device is found and is connectable via three connection modes, only the interaction component corresponding to the local-area-network-connection is displayed, and the interaction components corresponding to the other two connection modes are not provided for the time being. When a device is only connectable via Bluetooth and AP, only the interaction component corresponding to the Bluetooth connection is displayed according to the priority.

In some embodiments, the first interaction component may also be marked with information configured to characterize the connection mode with the highest priority. That is, in addition to the device information, the first interaction component may also be marked with the connection mode corresponding to the component, so that the user can confirm in which way the wireless connection may be established.

In some embodiments, when the wireless device is connectable via local area network, the local-area-network-connection is used as the connection mode with the highest priority. An advantage thereof is that as a most widely used device capable of providing the local-area-network-connection, a router can be connected with a large number of wireless devices. Especially in office and home scenarios, using the local-area-network-connection as the default highest priority connection mode meets needs of most users, and saves their time spent on browsing, selection, and operation, which greatly improves the user experience.

Figure 3:
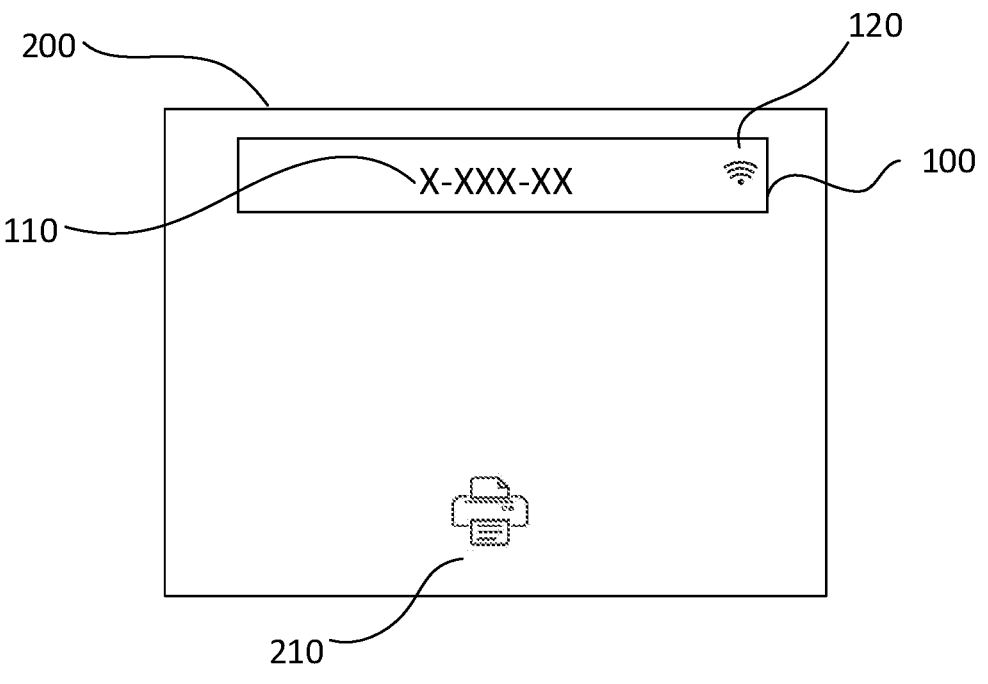
FIG. 3 illustrates a schematic diagram of a first interface and a first interaction component according to an embodiment of the present disclosure.
Figure 4:
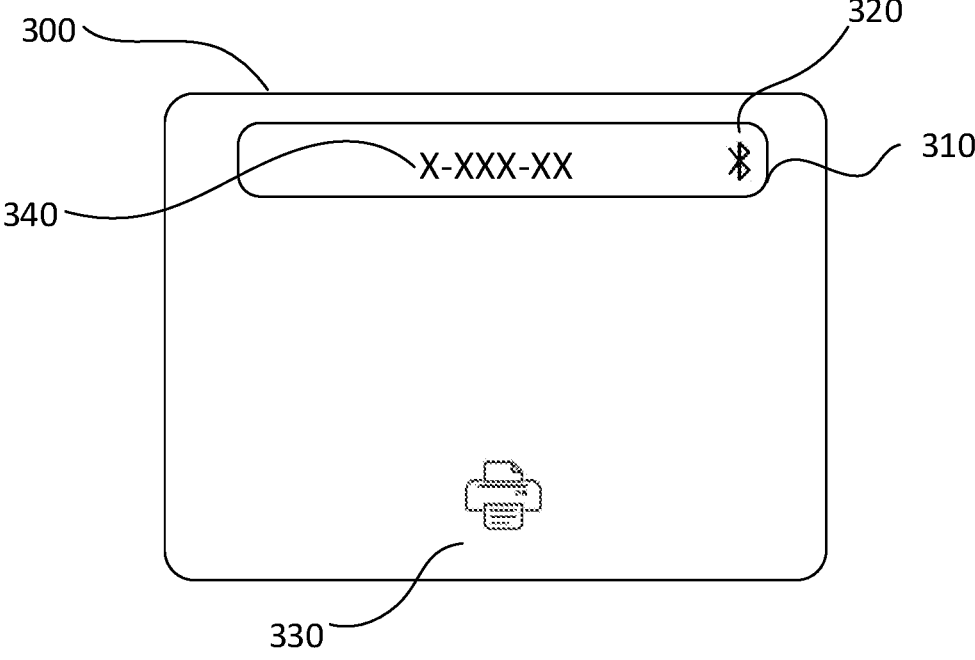
FIG. 4 illustrates a schematic diagram of a second interface and a second interaction component according to an embodiment of the present disclosure.

In order to further improve the user experience, the present disclosure also provides an improved embodiment on an interaction interface, and the principle thereof can be understood with reference to FIGS. 3 and 4. A first interaction component 100 is displayed on a first interaction interface 200. The first interaction interface 200 is also provided with a jump component 210, which is configured to jump to a second interaction interface 300 in response to a jump interaction signal to further search for the connectable wireless device. The second interaction interface 300 is configured to display a second interaction component 310, and the second interaction component 310 is configured to connect the connectable wireless device to a non-local area network. The present embodiment is an improved embodiment based on that the local area network is set as the highest priority. There are two interfaces, and the first interaction interface 200 is configured to display the first interaction component 100 corresponding to the local area network. The interface may be jumped to the second interaction interface 300 after the jump component 210 is clicked, and at this point, the second interaction component 310 configured to represent the connection mode of a non-local area network (such as Bluetooth in FIG. 3) may be displayed. If the user clicks on the second interaction component 310 at this point, the device corresponding to the component may be connected to the non-local area network. A notable effect of the present embodiment is a highlight of the connection mode of the local area network again, which reduces selection range for the user on a first interface, assists the user to find the wireless device in the local area network at the fastest speed, reduces time for the user to perform unnecessary operations, and improves processing efficiency for the user. If the device for connection does not support the local-area-network-connection, or the user wants to connect in other modes, another interaction component for jumping to another interface is also provided, so that instead of displaying multiple connection modes on one interface, a display interface of the local-area-network-connection is distinguished from a display interface of other connection modes. This display method facilitates the user to reasonably expect the connection type corresponding to the interaction component on the interaction interface when seeing the interaction interface, which avoids confusion. In particular, when all the wireless devices found are non-connectable via the local area network, only the second interaction interface is displayed, so that the user can fully aware that there is only non-local-area-network-connection nearby from the interaction interface. For example, if the first interaction interface and the second interaction interface are designed with different visual styles, the user may have reasonable expectations for the connection modes that exist nearby when seeing the second interaction interface, and may not spend too much time searching for devices that are not found.

Figure 5:
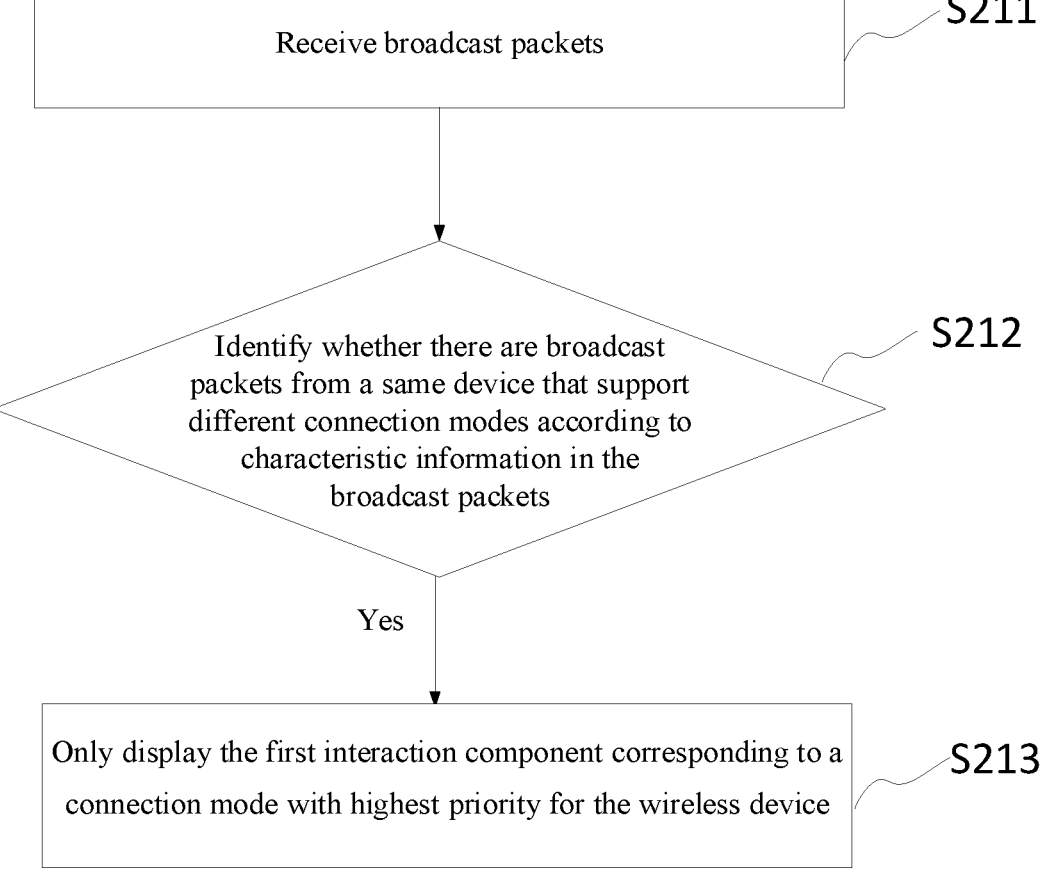
FIG. 5 illustrates a flow chart of an implementation manner of determining whether there are multiple connection modes according to an embodiment of the present disclosure.

There are many implementation manners to realize that when the wireless devices are being searched for, if a same wireless device is found through different communication methods, only the first interaction component is displayed for the wireless device. An implementation manner through broadcast packets will be described in detail below. As shown in FIG. 5, in operation S211, the broadcast packets are received continuously. In operation S212, it is identified whether there are broadcast packets from the same device that support different connection modes according to characteristic information in the broadcast packets, and if so, operation S213 is executed. In operation S213, only the first interaction component corresponding to the connection mode with the highest priority is displayed for the wireless device. In the embodiments shown in FIG. 5, different connection modes correspond to different ways of carrying the characteristic information. If the connection mode is the local-area-network-connection, the characteristic information is carried in udp broadcast packets. If the connection mode is the Bluetooth connection, the characteristic information is carried in Bluetooth broadcast packets. If the connection mode is the AP connection, the characteristic information is carried in SSID Tag of 802.11 Beacon packets. An advantage thereof is that the characteristic information is directly added in the broadcast packets, so that the mobile phone or PC can quickly determine type of the connection mode when parsing protocol, which greatly improves the processing efficiency and optimizes the user experience.

Figure 6:
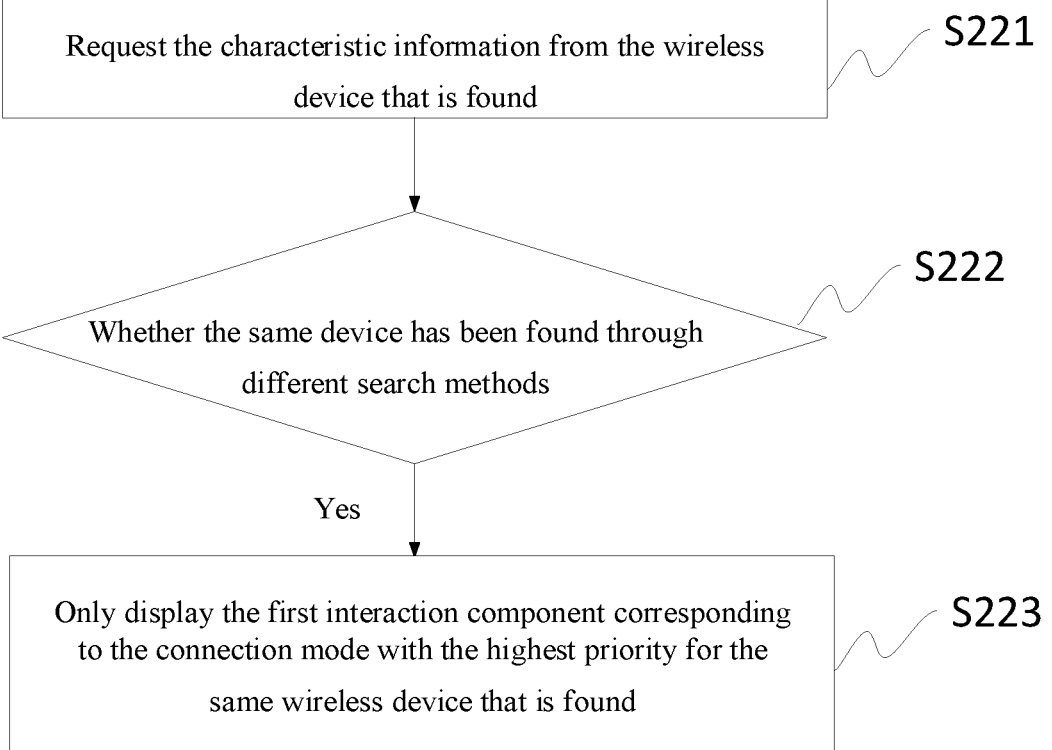
FIG. 6 illustrates a flow chart of another implementation manner of determining whether there are multiple connection modes according to an embodiment of the present disclosure.

There is another implementation manner to realize that when the wireless devices are being searched for, if a same wireless device is found through different communication methods, only the first interaction component is displayed for the wireless device. That is, it is tried to establish a connection with the wireless device, and a request is sent after the connection is established, so that the wireless device can return the characteristic information, and then it is determined according to returned information. A specific process is as follows, with reference to FIG. 6. In operation S221, the characteristic information is requested from the wireless device that is found. In operation S222, it is determined whether the same device has been found through different search methods according to received characteristic information, where the search method and the connection mode correspond to each other. If so, operation S223 is executed. In operation S223, only the first interaction component corresponding to the connection mode with the highest priority is displayed for the same wireless device that is found. One difference between the implementation manners shown in FIG. 6 and FIG. 5 is that in the embodiments of FIG. 5, the connection type corresponding to the broadcast packet is determined through the broadcast packet sent by the wireless device when no connection is established with the wireless device. In FIG. 6, there is a connection attempt, and a characteristic information request is sent to the device after the connection is established, so that the wireless device can return the characteristic information, and then the connection mode of the wireless device is determined accordingly. The connection can be disconnected after the characteristic information is received. Also, this process may not be displayed on the interface but executed in background, because the purpose of the present embodiment is only to obtain the characteristic information, rather than formally establish a connection with the device. In the embodiments shown in FIG. 6, process of requesting the characteristic information is different for different connection modes. If the connection mode is the local-area-network-connection, the characteristic information is requested from the wireless device in tcp/udp mode. If the connection mode is the Bluetooth connection, the characteristic information is requested from the wireless device after the Bluetooth connection is established. If the connection mode is the AP connection, the characteristic information is requested from the wireless device in tcp/udp mode after the AP is accessed. A notable effect of this setup is that the user does not need to modify the protocol, i.e., the characteristic information does not need to be added to the protocol, and a request signal can be sent separately after the connection is established to make the wireless device return the characteristic information. Therefore, when it is difficult to add the characteristic information to a protocol frame, the method in the present embodiment has stronger versatility, and the connection types that can be established by the wireless device can be obtained without modification of the protocol frame.

In an application scenario of an example embodiment, the wireless device is a printer with WLAN, Bluetooth, and AP connection functions. The display method described above may be, for example, a display strategy of interface, button, or icon of a smart phone APP. The first interaction component 100 is a graphic button that can be clicked on the touch screen as shown in FIG. 3, and a product model of the printer is marked as X-XXX-XX on the interaction component. The user currently owns a printer that has not been connected wirelessly, and has downloaded an APP for remote configuration of the printer. The user is in an office environment, and there are multiple printers nearby that can be connected wirelessly.

The user leaves the printer powered on and ready to connect to the wireless network, and at this point, a mobile phone APP is opened. The APP may continue to search for devices that can be connected within the communication distance, and a search method is to continuously receive the broadcast packets from the devices. For example, the mobile phone receives at least two types of broadcast packets (such as at least two of three types of Bluetooth broadcast packets, SAP broadcast packets, and local-area-network broadcast packets), and after analysis, it is found that they all come from the same device. The APP is set to refresh a list of connectable devices every certain time, and before the refresh, the APP determines that there is a printer with at least two connection modes. According to the preset priority (local area network>Bluetooth>AP), the APP chooses to only display the local-area-network-connection mode and hide other connection modes. An example presented interface is shown in FIG. 3, i.e., an interaction button 100 is displayed on the first interaction interface 200. When the user clicks the interaction button 100 through the touch screen, the wireless device is connectable via the local area network. At this point, if the device information displayed on the first interaction interface 200 is not what the user needs, the user may click a jump interaction button 210 at the bottom of the interface. After it is clicked, the APP can continue to search and jump to the second interaction interface 300, and a presented interface is shown in FIG. 4. At this time, the second interaction component 310 is displayed, and the user can click on this component through the touch screen to perform the Bluetooth connection. If the printer does not support the Bluetooth connection but supports AP connection, an interaction component corresponding to the AP connection is displayed on the second interaction interface 300, and the AP connection can be performed after it is clicked. It can be jumped back to the first interaction interface 200 after a jump component 330 at the bottom of the interface is clicked. In addition, if the printer does not support the local-area-network-connection, the first interaction interface 200 is skipped and the second interaction interface 300 is directly displayed. In some embodiments, the second interaction component of a different printer may be displayed on the second interaction interface. For example, printer 1 supports the Bluetooth connection, and the second interaction component corresponding to the printer that supports the Bluetooth connection is displayed on the second interaction interface; printer 2 that is found supports AP direct connection, and the second interaction component corresponding to the printer that supports the AP direct connection is displayed on the second interaction interface. Therefore, the user can select the printer connectable via the non-local-area-network-connection on the second interaction interface to perform network configuration.

It should be noted that there are some differences in the connection modes by clicking on the interaction components. The connection mode is Bluetooth, which refers to that the mobile phone and the printer are connected through Bluetooth function. The connection mode is the AP connection, which refers to that the printer itself serves as an AP access point for the mobile phone to connect with it. The connection mode is WLAN connection, which refers to that the printer has been connected to the same local area network as the mobile phone. For example, the printer has been connected to a router through WiFi, and after the first interaction component is clicked, communication with the printer can be established on the mobile phone through the same router, so that the APP on the mobile phone can successfully add the printer.

In an application scenario of another example embodiment, the characteristic information of the device is not obtained through the broadcast packets, and it is tried to establish a connection with the printer through the APP. Once the connection is established, the characteristic information request may be directly sent to the printer. After receiving the request, the printer sends the characteristic information to the APP, and the APP determines the connection types of the printer accordingly. The connection is disconnected after the APP receives the characteristic information. In this process, connection establishment information may not be displayed to the user on the interface, nor the connected device be displayed in the list of connectable devices. Instead, duplicate information may be removed before displayed on the interface (i.e., only one interaction component is displayed for the same device). With such setup, the characteristic information can be requested and sent without modification of communication protocol frame, which has strong versatility. In cases that the protocol does not support modification or a protocol field is occupied, the characteristic information can still be obtained, so that application scope thereof is very wide.

Figure 7:
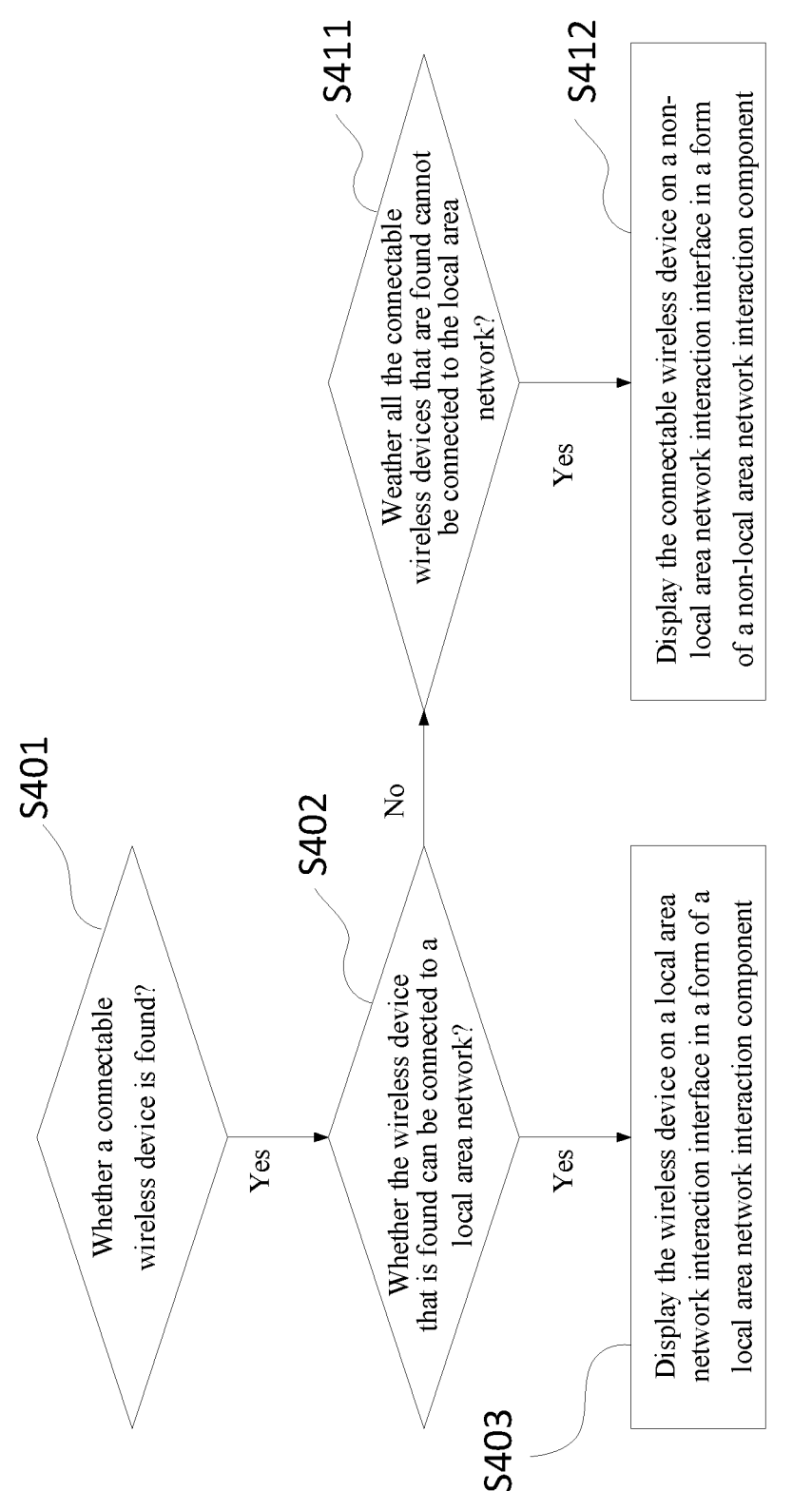
FIG. 7 illustrates a flow chart of another example embodiment of the present disclosure.

In another example embodiment, a method in which the wireless device that is found and supports the local-area-network-connection is displayed first is provided. The method includes processes S401-S403, as shown in FIG. 7. In operation S401, it is determined whether a connectable wireless device is found, and if so, operation S402 is executed. In operation S402, it is determined whether the wireless device is connectable via the local area network, and if so, operation S403 is executed. In operation S403, the wireless device is displayed on a local-area-network-interaction interface in a form of a local-area-network-interaction component. The local-area-network-interaction interface is only configured to display the local-area-network-interaction components corresponding to the wireless devices that is connectable via the local area network.

In one embodiment, when the user searches for the wireless device in the APP, whenever a wireless device is found, it is determined whether the wireless device supports the local-area-network-connection, and if not, the wireless device may not be displayed on the current interaction interface. When the wireless device that is found supports the local-area-network-connection, a button that can be clicked and triggered by the user is displayed for the device as the interaction component. When the user clicks the button, the mobile phone may establish a connection with the wireless device in the local-area-network-connection mode. The button is displayed on a particular interface, and all buttons displayed on this interface are used for the local-area-network-connection, and buttons corresponding to the non-local-area-network-connection modes may not be displayed on this interface. In other words, in the present embodiment, even if it is recognized that a device has the non-local-area-network-connection mode, the button corresponding to the non-local-area-network-connection mode may not be displayed on the interface. There are many forms of the interaction components. For example, a graphic area with boundaries can be displayed on screen of the mobile phone, and one or more of information such as device model, appearance icon, manufacturer, etc. can be displayed inside the graphic area according to the device information searched by the APP. Texts or icons of the wireless connection mode corresponding to the current button may also be displayed inside or around the button, so as to remind the user of function of the button. In the present embodiment, the wireless device that supports the local-area-network-connection among the multiple wireless devices that are found is displayed first, so that the user can establish communication between the mobile phone and the wireless device as soon as possible. Especially in a field of printers, it is convenient for the user to add the printer as soon as possible to a mobile printing APP of the mobile phone, which does not require cumbersome process of adding or network configuration.

As shown in FIG. 7, the method provided in the present embodiment also includes processes S411 and S412. In operation S411, it is determined whether the wireless devices that are found connectable by search are all non-connectable via the local area network, and if so, operation S412 is executed. In operation S412, the connectable wireless device is displayed on a non-local-area-network-interaction interface in a form of a non-local-area-network-interaction component. For example, a time threshold can be set for searching, and if no wireless device connectable via the local area network is found when the threshold is reached, the local-area-network-interaction interface may not be displayed. Instead, the button corresponding to the device is connectable via the non-local area network is displayed on another interface as the interaction component. This interface is only configured to display the buttons corresponding to the non-local-area-network-connection mode, but not the buttons corresponding to the local-area-network-connection mode. The non-local-area-network-interaction component is configured to establish the non-local-area-network-connection with the wireless device when triggered. For example, the non-local-area-network-connection mode may include the Bluetooth connection or the AP connection. When the device is non-connectable via the local area network but is only connectable via the Bluetooth, a graphic area is displayed on the local-area-network-interaction interface, and the user can click on the graphic area to connect the wireless device through the Bluetooth. In particular, the non-local-area-network-interaction interface only displays the non-local-area-network-interaction components corresponding to the wireless devices connectable via the non-local area network, and does not display the local-area-network-interaction components. For example, on a non-local-area-network-interaction interface, the interaction components corresponding to the Bluetooth or the AP may be displayed, but the interaction components for connecting to the local area network may not be displayed, so that the user can intuitively know function of the current interface through the interface.

The non-local-area-network-interaction component can be further divided into a first non-local-area-network-interaction component and a second non-local-area-network-interaction component, which are respectively configured to perform first and second non-local-area-network-connections. For example, the first non-local-area-network-interaction component may be an interaction button for representing the Bluetooth connection, while the second non-local-area-network-interaction component may be an interaction button for representing the AP connection, and vice versa. In some embodiments, the non-local-area-network-interaction interface is only configured to display one of the first and second non-local-area-network-interaction components, i.e., when the local area network cannot be found, only a Bluetooth connection interaction button or only an AP connection interaction button is displayed on the non-local-area-network-interaction interface. An advantage thereof is that different types of the connection modes can be displayed separately according to interface level, which avoids displaying different connection modes on the same interface and causing the user to face complicated interaction buttons. In some other embodiments, the local-area-network-interaction component and/or the first non-local-area-network-interaction component and/or the second non-local-area-network-interaction component are also marked with information configured to characterize the corresponding connection mode. For example, information in a form of icons or texts may be displayed to remind the user what kind of connection the interaction component is used for, so that the user can quickly determine function of the interaction component through appearance of the interaction component, which can improve the user experience and reduce operation difficulty for the user.

Figure 8A:
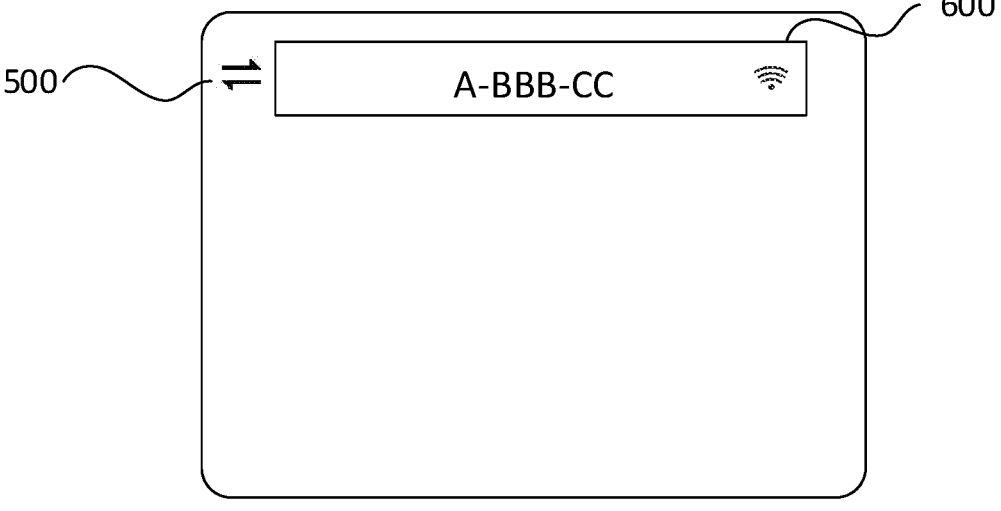
FIG. 8A illustrates an interface display before a switch component is clicked according to an embodiment of the present disclosure.
Figure 8B:
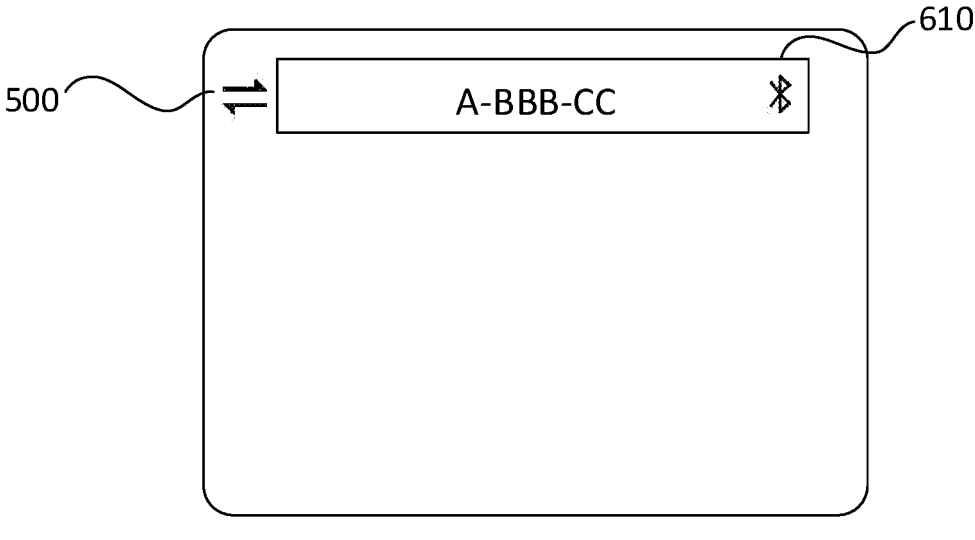
FIG. 8B illustrates an interface display after a switch component is clicked according to an embodiment of the present disclosure.

The process described above is a process in which the display of the interaction components is automatically refreshed. In order to allow the users to freely switch the interaction buttons corresponding to different connection modes on the interface according to their own needs, a switch component is also included in an embodiment of the present disclosure. The switch component is configured to display the first non-local-area-network-interaction component instead of the local-area-network-interaction component when triggered, and the first non-local-area-network-interaction component is configured to establish a first non-local-area-network-connection with the wireless device when triggered. An example is shown in FIGS. 8A and 8B, where a local-area-network-interaction component 600 is displayed on the interface, and after the user clicks on a switch component 500, not the local-area-network-interaction component 600 but a Bluetooth or AP interaction component 610 is displayed on the interface. Further, the switch component 500 may also be configured to display the second non-local-area-network-interaction component instead of the first non-local-area-network-interaction component when triggered again, and the second non-local-area-network-interaction component is configured to establish a second non-local-area-network-interaction component with the wireless device when triggered. That is, when the user clicks on the switch component again, another non-local-area-network-interaction component may be displayed on the interface. For example, if the Bluetooth (or AP) interaction component is displayed on the interface when the switch component is clicked for the first time, the AP (or Bluetooth) interaction component may be displayed on the interface when the switch component is clicked again. When the user clicks on the switch component for the third time, not the AP (or Bluetooth) interaction component but the local-area-network-interaction component may be displayed on the interface. It should be noted that the display priority described above can be adjusted according to actual needs. For example, the AP connection may be displayed when the user clicks on the switch component for the first time, and the Bluetooth connection may be displayed when the user clicks on the switch component for the second time. With such setup, the users can manually select the connection mode they need, which makes the operation more flexible and convenient. Also, different types of the connection modes can be displayed separately on the interface, which makes the display interface more intuitive and clear.

In order to avoid frequent program jumps between different interfaces due to too many interfaces, the first and second non-local-area-network-interaction components can be displayed on the non-local-area-network-interaction interface at the same time. But with such setup, when a wireless device is connectable via both first non-local area network and second non-local area network, two interaction components may be displayed for the same device on the non-local-area-network-interaction interface, which makes the interface complicated and interferes with user's judgment and selection. Therefore, a solution for removing duplicate interaction components is also provided in an embodiment of the present disclosure. When the non-local-area-network-interaction interface is configured to display both the first non-local-area-network-interaction component and the second non-local-area-network-interaction component, it is determined whether both the first non-local-area-network-connection and the second non-local-area-network-connection can be established with the same wireless device that is found before the non-local-area-network-interaction interface is displayed. If so, only one of the first non-local-area-network-interaction component and the second non-local-area-network-interaction component is displayed for the wireless device on the non-local-area-network-interaction interface. For example, before the non-local-area-network-interaction interface is displayed, it is determined whether a terminal and a wireless device are connectable via both the Bluetooth and the AP, and if so, only the Bluetooth connection or only the AP connection is displayed on the non-local-area-network-interaction interface. It can be preset for which one to be displayed. Advantages of such setup are listed as followings. First, there is no need to display three interfaces for the three wireless connection modes, which reduces jump times between the interfaces. Second, it is avoided to display multiple interaction components for the same wireless device, which makes the interface more streamlined and reduces unnecessary time spent by the user interacting with the interface.

Figure 9:
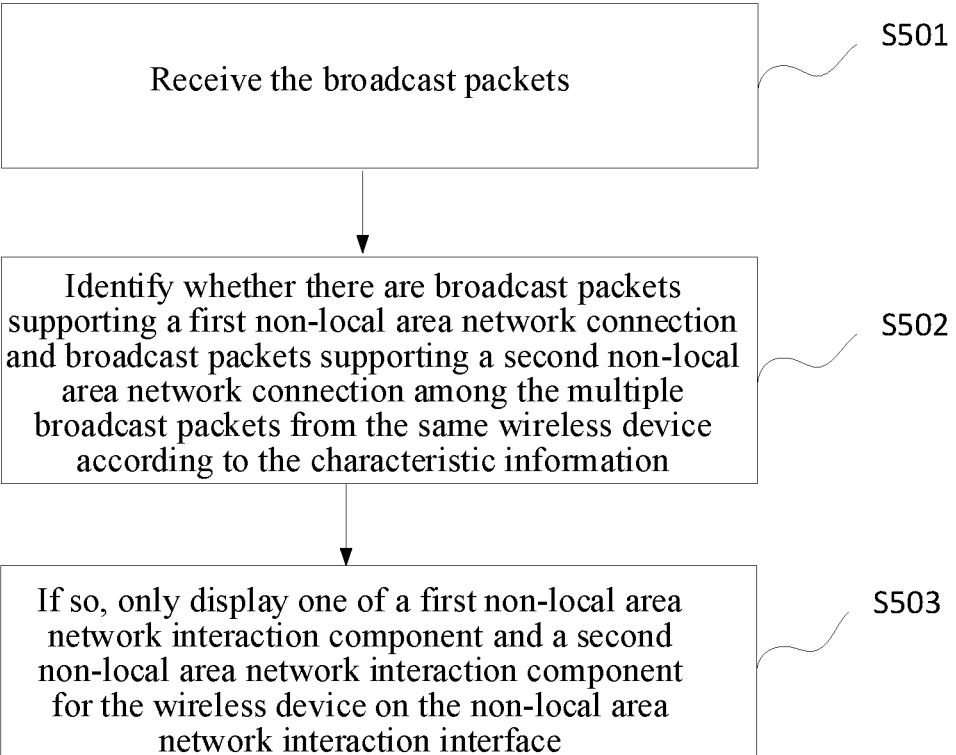
FIG. 9 illustrates a flow chart of another example embodiment of the present disclosure.

Further, a method of determining whether both the first non-local-area-network-connection and the second non-local-area-network-connection can be established with the same wireless device that is found is shown in FIG. 9, which includes processes S501-S503. In operation S501, the broadcast packets are received. In operation S502, it is identified whether there are broadcast packets supporting the first non-local-area-network-connection and broadcast packets supporting the second non-local-area-network-connection among the multiple broadcast packets from the same wireless device according to the characteristic information. In operation S503, if so, only one of the first non-local-area-network-interaction component and the second non-local-area-network-interaction component is displayed for the wireless device on the non-local-area-network-interaction interface. The first non-local-area-network-connection is one of the Bluetooth connection and the AP connection, and the second non-local-area-network-connection is the other one of the Bluetooth connection and the AP connection. In an example embodiment, the first non-local-area-network-connection is the Bluetooth connection, and the second non-local-area-network-connection is the AP connection, then the characteristic information of the Bluetooth connection is carried in the Bluetooth broadcast packets, and the characteristic information of the AP connection is carried in the SSID Tag of 802.11 Beacon packets. That is, by capturing and analyzing the characteristic information in data packets, it can be determined whether both the Bluetooth connection and the AP connection can be established with the same wireless device that is found. An advantage of such setup is that it can be accurately determined whether the same wireless device is connectable via different connection modes, so that the user is prevented from being unable to determine which method should be used to connect the wireless device, which greatly reduces the operation difficulty for the user and improves the user experience.

In another example embodiment, scenario characteristics of the user being in the office environment are highlighted for optimization. Since the mobile phone of the user and the printer for connection in the office environment are more likely to be in the same local area network, if the printer connectable via the local area network is preferentially displayed on the interface at this time, time spent by the user in selecting the connection mode of the device in the office environment may be greatly reduced. In an example, the user opens the mobile phone APP, and the APP searches for nearby wireless devices that is connectable. Only the interaction component corresponding to the printer connectable via the WLAN is displayed on the first interface. By clicking on the interaction component, the user can establish communication between the mobile phone and the printer that is already connected to the same WLAN as the mobile phone (i.e., the printer is successfully added to the APP), and the user can send jobs to the added printer through the APP for printout. If no device connectable via the local area network is found within predetermined time, the non-local-area-network-interaction interface may be displayed, and all devices that are found and connectable via the Bluetooth and the AP may be displayed in the non-local-area-network-interaction interface. In particular, if it is identified that the same device has multiple non-local-area-network-connection modes, only the second interaction component corresponding to one of the connection modes is displayed according to preset rules. For example, before the non-local-area-network-interaction interface is displayed on the mobile phone, if a same printer can be found through the Bluetooth and the AP, only the first non-local-area-network-interaction component corresponding to the Bluetooth connection or the second non-local-area-network-interaction component corresponding to the AP connection may be displayed for the printer when the non-local-area-network-interaction interface is displayed. That is, when the mobile phone found the printer through at least two communication methods of Bluetooth and AP, display information of the printer may be deduplicated, and only printer information corresponding to the Bluetooth connection or printer information corresponding to the AP direct connection is displayed for the same printer that is found, so that confusion can be avoided for the user and the user can quickly select a method to establish communication connection between the mobile phone and the printer.

In another example embodiment, the non-local-area-network-interaction interface is only configured to display one of Bluetooth interaction components and AP interaction components. The Bluetooth is taken as an example herein. If the user does not find a wireless device connectable via the local area network, but finds a wireless device connectable via the Bluetooth or a wireless device connectable via both the Bluetooth and the AP, only the Bluetooth interaction component is displayed on the non-local-area-network-interaction interface. If the user does not find a wireless device connectable via the Bluetooth, only the AP interaction component is displayed on the non-local-area-network-interaction interface. In the present embodiment, the display priority is set for different connection modes, and an interaction component with a lower priority may only be displayed when an interaction component with a higher priority is not found.

In another example embodiment, an additional switch button is displayed on the interaction interface. When the switch button is clicked for the first time, the printer that is found through the local area network may not be displayed on the interface, and the printer found through the Bluetooth (or the AP) is displayed. When the switch button is clicked again, the printer found through the Bluetooth (or the AP) is not displayed on the interface, and the printer found through the AP (or the Bluetooth) is displayed. When the switch button is clicked for the third time, it is returned to local area network display mode. With such setup, the user can flexibly select the printer that is found through different methods on the same interface, without having to exit from the interface to select another search method again. In the meanwhile, it is ensured that only one button is displayed for one device at a time, so that the user does not get confused.

In another example embodiment, the mobile phone of the user cannot find the printer through the local area network, Bluetooth, or AP. At this time, the mobile phone can display a prompt message on the interface, prompting the user to press a WiFi key or scan a QR code at a body of the printer. This is considering that if the user cannot successfully find the printer, it may be because the user has not connected the printer to the network and/or the printer is not in a state discoverable by a Bluetooth device and/or the mobile phone has not obtained necessary access information for the AP connection. Displaying information on a mobile phone interface that guides the user to press the WiFi key or scan the QR code can help eliminate the above-mentioned abnormal states. For example, for a first type printer, after the user presses the WiFi key, the printer may output the QR code containing necessary network configuration information. The necessary network configuration information can be information such as SSID and password of softAP module built in the printer. The user scans the QR code with the mobile phone to obtain the necessary network configuration information, and uses the necessary network configuration information to make the mobile phone and the printer in the same local area network. Then the mobile phone can discover the printer through the local area network. In a second type printer, the user presses the WiFi key to make the printer enter a Bluetooth scanning state. At this time, the printer may be in a state that can be discovered by the Bluetooth device, and then the user can find the printer through the mobile phone. In a third type printer, the QR code is attached to the body of the printer. The user scans the QR code to obtain the necessary network configuration information, and makes the printer and the mobile phone in the same local area network through the necessary network configuration information. Then the user can find the printer through the mobile phone.

In another example embodiment, the mobile phone may store information for the printers that are in the same local area network as the mobile phone. If there are printers in the same local area network as the mobile phone, and the user initiates a search request, the mobile phone can prompt the user that there are available printers in the current local area network and whether to continue searching. Only when the user chooses to continue searching, the mobile phone may enter a search page to perform search function, so that the user can be prevented from spending unnecessary waiting time repeatedly searching for the available printers.

One technical effect in the first aspect of the present disclosure is to avoid repeated displays of the same device in different connection modes on the interaction interface, which reduces the time spent by the user when choosing a device connection mode, so that the software is easier to use, and use efficiency is thereby improved. One technical effect in the second aspect of the present disclosure is to show the local-area-network-connection mode first, and further optimize an office scene, which can greatly improve the use efficiency for the user in the office environment.

Various embodiments of the present disclosure further provide an electronic device. The electronic device may include a memory configured to store a computer program and a processor communicatively coupled to the memory. When the computer program is being executed, the processor is configured to perform the disclosed display methods of a wireless device for connection.

Various embodiments of the present disclosure further provide a non-transitory computer readable storage medium that contains a computer program. When being executed, the computer program causes a processor or a computer to perform the disclosed display methods of a wireless device for connection.

Although some embodiments of the present disclosure have been described in detail through examples, those skilled in the art should understand that the above examples are for illustration only and not intended to limit the scope of the present disclosure. Those skilled in the art should understand that modifications can be made to the above embodiments without departing from the scope and spirit of the present disclosure. The scope of the present disclosure is defined by the appended claims.

What is claimed is:

1. A display method of a wireless device for connection comprising:

during a wireless device search, in response to a same wireless device being found through different communication methods, only displaying a first interaction component for the wireless device by performing receiving broadcast packets, identifying, according to characteristic information in the broadcast packets, that there are multiple broadcast packets that are from the same wireless device and support different connection modes; and only displaying the first interaction component corresponding to a connection mode with a highest priority for the wireless device, wherein:

the connection mode includes at least two of local-area-network-connection, Bluetooth connection, and AP connection;

the first interaction component is marked with device information of the wireless device; and the first interaction component is configured, in response to a first interaction signal, to connect with the wireless device in a connection mode with the highest priority.

2. The method according to claim 1, wherein the first interaction component is further marked with information configured to characterize the connection mode with the highest priority.

3. The method according to claim 1, further comprising: when the wireless device is connectable via a local area network, using a local-area-network-connection as the connection mode with the highest priority.

4. The method according to claim 3, wherein:

the first interaction component is displayed on a first interaction interface;

the first interaction interface is also provided with a jump component configured to jump to a second interaction interface in response to a jump interaction signal; and the second interaction interface is configured to display a second interaction component, and the second interaction component is configured to connect to the connectable wireless device via a non-local area network.

5. The method according to claim 4, further comprising: when all of wireless devices found by the wireless device search are non-connectable via the local area network, only displaying the second interaction interface.

6. The method according to claim 1, wherein:

in response to the connection mode being the local-area-network-connection, the characteristic information is carried in udp broadcast packets;

in response to the connection mode being the Bluetooth connection, the characteristic information is carried in Bluetooth broadcast packets; and in response to the connection mode being the AP connection, the characteristic information is carried in SSID Tag of 802.11 Beacon packets.

7. The method according to claim 1, further comprising:
requesting characteristic information from searched wireless devices; and
determining that the same wireless device has been found through different search methods according to received characteristic information for displaying the first interaction component corresponding to the connection mode with the highest priority for the same wireless device, the search method and the connection mode corresponding to each other.

8. The method according to claim 7, wherein:
in response to the connection mode being the local-area-network-connection, the characteristic information is requested from the wireless device in tcp/udp mode;
in response to the connection mode being the Bluetooth connection, the characteristic information is requested from the wireless device after the Bluetooth connection is established; and
in response to the connection mode being the AP connection, the characteristic information is requested from the wireless device in tcp/udp mode after the AP is accessed.

9. A display method of a wireless device for connection comprising:
when a wireless device is found connectable by search, and in response to the wireless device being connectable via a local area network, displaying the wireless device on a local-area-network-interaction interface in a form of a local-area-network-interaction component;
wherein:
the local-area-network-interaction component is configured, when being triggered, to establish a local-area-network connection with the wireless device;
the local-area-network-interaction interface is only configured to display the local-area-network-interaction component corresponding to the wireless device that is connectable via the local area network,
wherein:
when wireless devices that are found connectable by search are all non-connectable via the local area network, the connectable wireless devices are displayed on a non-local-area-network-interaction interface in a form of a non-local-area-network-interaction component; and
the non-local-area-network-interaction component is a first non-local-area-network-interaction component configured to make a first non-local-area-network-connection or a second non-local-area-network-interaction component configured to make a second non-local-area-network-connection;
the method further comprising,
in response to the non-local-area-network-interaction interface being configured to display both the first and second non-local-area-network-interaction components, determining that both the first and second non-local-area-network-connections are established with the same wireless device that is found before the non-local-area-network-interaction interface is displayed by performing:
receiving broadcast packets;
identifying, according to characteristic information, that there are broadcast packets that support the first non-local-area-network-connection and broadcast packets that support the second non-local-area-network-connection among multiple broadcast packets from the same wireless device; and
only displaying one of the first and second non-local-area-network-interaction components for the wireless device on the non-local-area-network-interaction interface.

10. The method according to claim 9, wherein:
the non-local-area-network-interaction component is configured, when being triggered, to establish a non-local area-network connection with the wireless device; and
the non-local-area-network-interaction interface only displays the non-local-area-network-interaction component corresponding to the wireless device connectable via a non-local area network.

11. The method according to claim 9, wherein the non-local-area-network-interaction interface is only configured to display the first non-local-area-network-interaction component.

12. The method according to claim 9, further comprising:
a switch component configured to, when triggered, display a first non-local-area-network-interaction component instead of the local-area-network-interaction component, the first non-local-area-network-interaction component being configured to, when triggered, establish a first non-local-area-network-connection with the wireless device.

13. The method according to claim 12, wherein the switch component is configured to, when triggered again, display the second non-local-area-network-interaction component instead of the first non-local-area-network-interaction component, the second non-local-area-network-interaction component being configured to, when triggered, establish a second non-local-area-network-interaction component with the wireless device.

14. The method according to claim 9, wherein:
the first non-local-area-network-connection is one of Bluetooth connection and AP connection; and
the second non-local-area-network-connection is the other one of the Bluetooth connection and the AP connection.

15. The method according to claim 14, wherein:
characteristic information of the Bluetooth connection is carried in Bluetooth broadcast packets; and
characteristic information of the AP connection is carried in SSID Tag of 802.11 Beacon packets.

16. The method according to claim 9, wherein the local-area-network-interaction component and/or the first non-local-area-network-interaction component and/or the second non-local-area-network-interaction component are also marked with information configured to characterize a corresponding connection mode.

* * * * *